Feb. 16, 1954     M. RIDDIFORD ET AL     2,669,661
APPARATUS FOR TREATING WATER
Filed Nov. 29, 1949     3 Sheets-Sheet 3
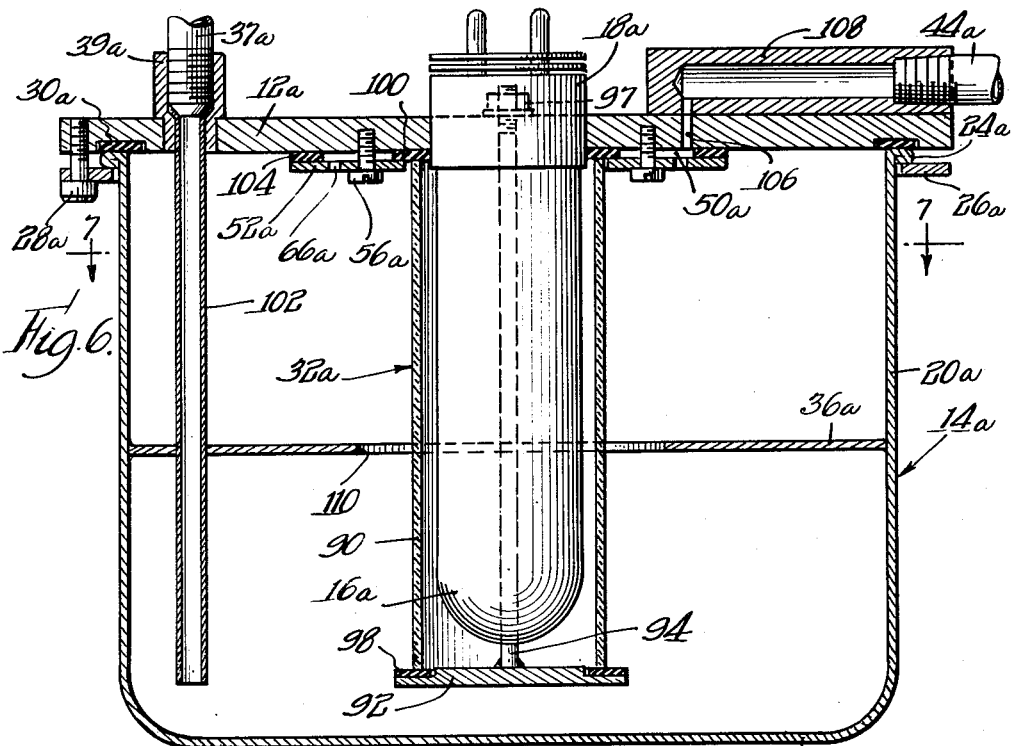
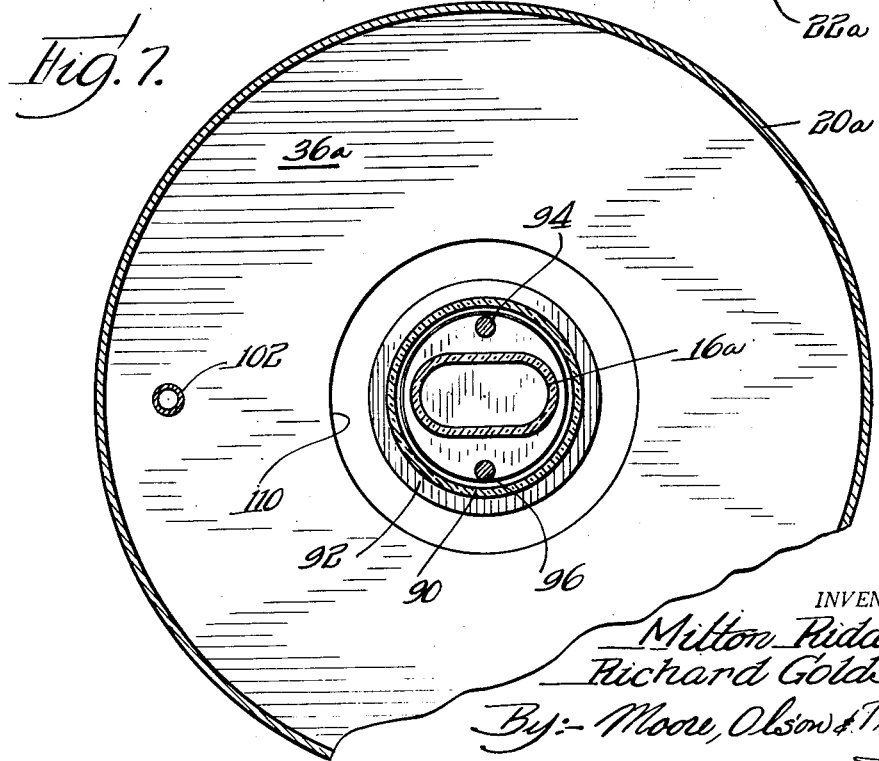
INVENTORS
Milton Riddiford
Richard Goldstein
By:- Moore, Olson & Trexler
attys Patented Feb. 16, 1954

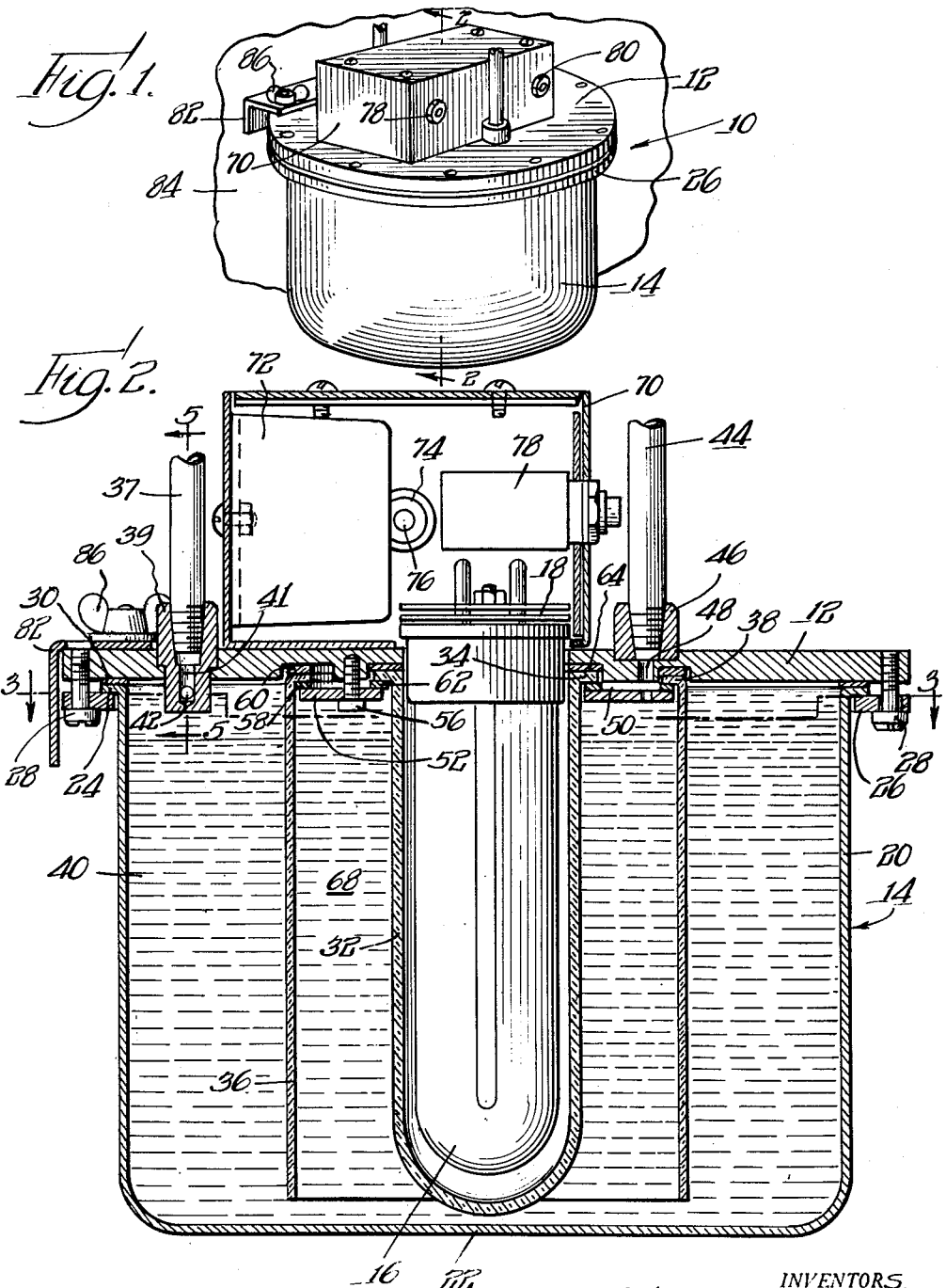

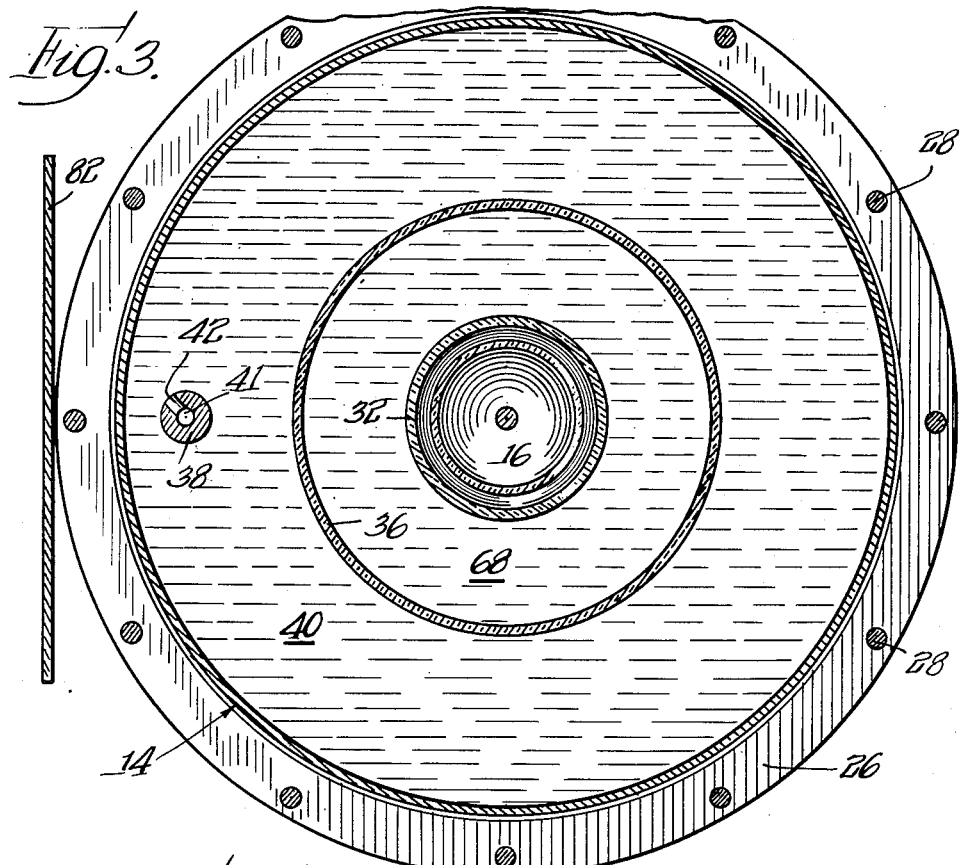
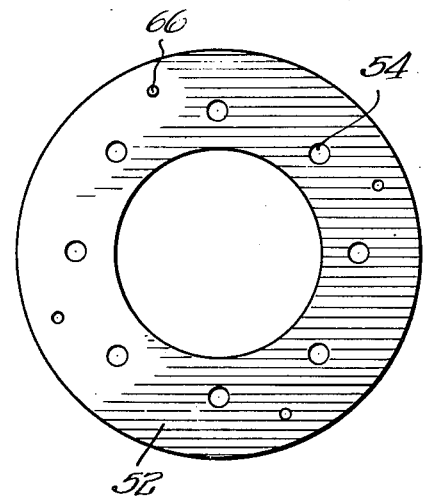
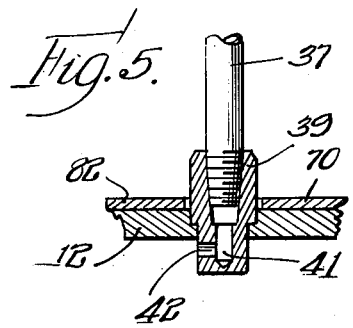

2,669,661

UNITED STATES PATENT OFFICE 2,669,661

APPARATUS FOR TREATING WATER

Milton Riddiford and Richard Goldstein, River Forest, Ill., assignors to A. R. F. Products, Inc., River Forest, Ill., a corporation of Illinois Application November 29, 1949, Serial No. 129,922

16 Claims. (Cl. 250—43)

1

The present invention relates to purification and germicidal apparatus and more particularly to apparatus for purification and germicidal disinfection of water for human consumption.

Various devices have been developed to disinfect water using irradiation of infected water with certain frequencies of electromagnetic radiation such as those in the ultra-violet range. The devices used heretofore have generally proved to be unsatisfactory for one or more reasons. For example, in certain types of apparatus the radiation transmitting portions of the device soon become coated with materials which render transmission therethrough less efficient and thus prohibits efficient and satisfactory disinfecting of the water being treated. Other devices will not provide a sufficient period or intensity of irradiation due to the inadequate exposure of the water being treated to the disinfecting radiation.

The present invention contemplates providing a water irradiating apparatus embodying improved water distributing and flow control structures, which structures are readily accessible for cleaning and other servicing.

Therefore it is an important object of the present invention to provide an improved apparatus of the type described in which the irradiating passages and chambers are readily accessible for cleaning and servicing.

Another object of the invention is to provide an improved water distributing and conveying structure in water disinfecting apparatus of the type described.

More specifically it is an object of the invention to provide an improved irradiating chamber and structure for introducing water into the chamber whereby to insure satisfactory treatment of the water.

A further object of the invention is to provide a water disinfecting apparatus of the type described in which the length of exposure to the radiation is positively controlled to provide maximum effectiveness of disinfection and efficiency.

These and other objects and advantages of the invention will be more apparent after perusal of the accompanying specification when taken in connection with the drawings wherein:

Figure 1 is a perspective view of an apparatus embodying the principles of the present invention attached to a supporting wall and having the water conduits thereto shown broken;

Figure 2 is an enlarged vertical cross sectional view of the apparatus shown in Figure 1 as seen in the direction of the arrows along the line 2—2 thereof;

2

Figure 3 is a partial view in horizontal cross section of the device shown in Figure 2 substantially as seen in the direction of the arrows along the line 3—3 thereof;

Figure 4 is a plan view of the water outlet orifice plate;

Figure 5 is a partial view in vertical cross section of the water inlet as seen in the direction of the arrows along the line 5—5 of Figure 2;

Figure 6 is a cross sectional view similar to Figure 2 showing a modified disinfecting apparatus embodying the principles of the present invention with certain of the electrical components removed; and Figure 7 is a partial cross sectional view of the apparatus shown in Figure 6 as see in the direction of the arrows along the line 7—7 thereof.

Referring to the drawings in which like numerals have been used to indicate like parts throughout, Figure 1 shows a water disinfecting apparatus embodying the principles of the present invention and generally designated by the numeral 10. The apparatus described herein is particularly adapted to be used in the germicidal disinfecting of water but it is to be understood that it is useful for other applications as well. Disinfecting apparatus 10 comprising generally a water chamber formed by a base plate 12 and a casing 14 and a source of germicidal radiation such as a germicidal lamp 16 which is mounted in a prong socket 18. The base plate 12 is a generally circular piece of metal or other suitable material and has appropriate apertures and recesses formed therein to receive parts which will be described hereinafter. The casing 14 has a generally cylindrical outer wall 20 whose diameter is slightly less than the diameter of base plate 12. Casing 14 is closed at one end thereof by a circularly shaped wall 22 and on the circumference of the other end has formed a laterally and outwardly extending flange 24 by which the casing 14 is attached to base plate 12. Casing 14 may be made of any suitable material such as a metal, a preferred metal being aluminum which will reflect certain of the germicidal radiations thereby increasing the efficiency of the apparatus. A casing ring 26 is provided for attaching the casing 14 to the base plate 12. The inner diameter of ring 26 is slightly greater than the diameter of the cylindrical wall 20, but is smaller than the diameter of the flange 24. A plurality of corresponding apertures are formed in the base plate 12 and the ring 26 to receive bolts 28 which attach the ring 26 to the base plate 12. In assembling the casing 14 to the base plate 12 a water tight gasket 30 is placed on the outwardly extending flange 24 of casing 14; the ring 26 is placed in position underneath flange 24 and then the bolts 28 are screwed into position to secure the assembly together. The provision of the gasket 30 insures that a water tight connection is obtained.

The apparatus as illustrated in the drawings utilizes a U-shaped 4-watt germicidal lamp which is mounted in the center of the base plate 12 and extends perpendicularly thereto. It is to be understood that other suitable forms of germicidal lamps or sources of radiation may be used. A lamp enclosure 32 which has a shape complementary to that of the envelope of lamp 16 is provided to protect the lamp 16 from the water being treated. The lamp enclosure 32 has an outwardly and laterally extending flange 34 formed on the open end thereof by which the enclosure may be attached to base plate 12 by a structure which will be described later. Enclosure 32 is made of a radiation transmitting material such as a special glass, quartz, suitable plastic or other material which will transmit radiation in the germicidal range such as the ultra-violet range.

A cylindrical baffle 36 is provided which is mounted concentric with the source of germicidal radiation and is interposed between the enclosure 32 and the casing wall 20. The baffle is open at both ends and at one end thereof has an inwardly and laterally extending flange 38 formed thereon. Baffle 36 is attached to the base plate 12 by means of flange 38 and a suitable attaching structure which will be described later. The length of baffle 36 is slightly less than the length of casing 14 whereby to provide clearance between the bottom of baffle 36 and wall 22 for a purpose to be described later. Baffle 36 must also be made of a germicidal radiation transmitting material such as that described above for the lamp enclosure 32.

A pipe 37 conducts water from a source (not shown) to a water inlet structure 39 which empties into the chamber 40 formed between the wall 20 of casing 14 and the baffle 36. As may be best seen in Figure 5 the water inlet structure 39 is adapted threadedly to receive the conduit 37 and is suitably connected or attached to the base plate 12. Water coming from conduit 37 enters a chamber 41 to which is connected a water inlet orifice or nozzle 42. Orifice 42 is so constructed that the water issues in a direction parallel to base plate 12 and perpendicular to the axis of the casing 14. As may be seen in Figure 3 the direction of entrance in a horizontal plane is at an acute angle less than 90 degrees with respect to a diameter of the casing 14. The particular direction in which the orifice 42 is oriented produces a maximum of mixing and turbulence within chamber 40 while the apparatus is in operation.

An outlet conduit 44 is attached through a coupling 46 to the base plate and is in fluid connection with a passage 48 within base plate 12. Passage 48 in turn connects with a chamber 50 formed between an enclosure ring 52 and the base plate 12.

Enclosure ring 52 is preferably made of metal or other suitable material and has an outer diameter which is slightly less than the inner diameter of baffle 36 and an inner diameter which is slightly greater than the outer diameter of the lamp enclosure 32. As may be seen from Figure 4 which is a plan view of enclosure ring 52, a plurality of apertures 54 are provided around the circumference thereof to receive screws 56 by which the enclosure ring 52 may be attached to the base plate 12. It is the enclosure ring 52 which attaches the lamp enclosure 32 and the baffle 36 to base plate 12. Suitable water-tight gaskets 58 and 60 are provided for the upper and lower surfaces respectively of the flange 38 of baffle 36 and other gaskets 62 and 64 are provided for the upper and lower sides respectively of flange 34 of lamp enclosure 32. When the parts are assembled as shown in Figure 2 and the bolts 56 are screwed into position, the lamp 16 is entirely protected from contact with water within casing 14 and the chamber 50 is formed between the enclosure ring 52 and the base plate 12. With this method of attachment of enclosure 32 and baffle 36 it will be seen that these members are readily removable for inspection, servicing and cleaning once casing 14 is removed. This feature is particularly important when the water being treated contains large quantities of dissolved minerals or other materials which may form coatings or sediments upon the surfaces of these members. This structure also facilitates the ready and easy replacement of the germicidal lamp 16.

A plurality of orifices 66 are provided in enclosure ring 52 around the circumference thereof to provide passages between a chamber 68 formed between the baffle 36 and the lamp enclosure 32 and the chamber 50. The number and size of these orifices are so arranged that the flow of water through chambers 40 and 68 is such as to give a maximum efficiency of effective germicidal action or kill with a given inlet water pressure. A different number and size of orifices can be provided for various inlet pressures. This feature is particularly important since the degree of disinfection or kill is proportional to the time for which the water is exposed to the germicidal radiation. This time is in turn directly proportional to the rate of flow of water through chambers 40 and 68 which is proportional to the inlet water pressure and the size of the outlet orifices. By selecting the proper size and number of the orifices 66 it is possible to regulate the period of exposure of the water to germicidal radiation and therefore insure an effective disinfection.

The electrical components for starting, stopping and operating the germicidal lamp 16 are enclosed within and mounted on a housing 70. These components include a ballast 72, a grommet 74 for supporting and insulating the power cord 76 from housing 70, a push-to-start switch 78 and a push-to-stop switch 80 (see Figure 1). These components are connected with each other and the lamp socket 18 in conventional manner so that the lamp 16 is energized when the push-to-start switch 78 is pushed and de-energized when the push-to-stop switch 80 is pushed.

An angle bracket 82 is provided for attaching the water disinfecting apparatus to a wall 84 or other suitable support. A plurality of wing nuts 86 secure brackets 82 to the base plate 12 and a series of screws (not shown) attach the bracket 82 to the supporting surface.

An important feature of the present invention is the spacing of the casing wall 20 from the source of germicidal radiation and the spacing of the baffle 36 from this source of radiation. The diameter of casing 14 is preferably so chosen that at least 90 per cent of the germicidal radiation is absorbed in the area between the source of radiation and the inner side of wall 20 when the apparatus is in operation. It has been found that with this spacing of the wall 20 with respect to the source of radiation, the maximum effectiveness and efficiency of killing and disinfection is obtained. The baffle 36 is of such a diameter that the intensity of the germicidal radiation striking the inner wall thereof is at least equal to the average intensity of the radiation throughout the apparatus with the particular baffle structure and casing shown. All the water which enters from the inlet conduit must pass downwardly the length of the casing 14, during which travel it will be irradiated, after which it flows underneath the lower edge of baffle 36 and then must flow upwardly the entire length of the casing 14 through chamber 68 to reach the outlet chamber 50. The number and size of the orifices 66 are so chosen that the rate of flow of water through chamber 66 is such that at least 99 per cent of the contaminating organisms would be killed by the intensity of radiation striking the inner wall of baffle 36. The rate of flow is calculated to accommodate all variations in the ultra-violet opacity of waters normally encountered and a safety factor is added to allow for a certain amount of accumulation of material on the radiation transmitting portions of the apparatus.

If a U-shaped 4-watt germicidal lamp such as the one illustrated in the drawing is used, the outer diameter of the lamp enclosure 32 will be about one and one-half inches. By assuming an average opacity and absorption of the water to be treated it is found that diameter of casing 14 should be approximately six inches to obtain 90 per cent absorption of the germicidal radiation in the area between the lamp 16 and casing 14. To have the intensity of the radiation at the inner wall of baffle 36 at least equal to the average intensity throughout the chambers 40 and 68, the diameter of baffle 36 is approximately three inches. With these dimensions the allowable rate of flow of water through the apparatus is between 0.5 and 0.7 gallon per minute and the number and size of the orifices in plate 52 are chosen accordingly. It is to be understood that the above figures are illustrative only and are not given by way of limitation.

Figures 6 and 7 illustrate a second form of germicidal disinfecting apparatus which embodies the principles of the present invention. This embodiment of the invention comprises a base plate 12a which corresponds to the base plate 12 of the embodiment shown in Figures 1–5 with which cooperates a casing 14a to form a chamber to receive the water or other fluid to be treated. Casing 14a comprises a cylindrical outer wall 20a, end wall 22a and laterally extending flange 24a which corresponds to parts 20, 22 and 24 described above.

A casing ring 26a, bolts 28a and a water tight gasket 30a are provided to seal the casing 14a in a water tight manner against the base plate 12a.

A source of germicidal radiation in the form of an ultra-violet germicidal lamp 16a is provided which fits into a suitable socket 18a. The transparent envelope of the lamp 16a is enclosed by a closure member generally designated by the numeral 32a which comprises a generally cylindrical tube 90 of germicidal disinfecting radiation transmitting material such as has been described above. A circular plate 92 which has a diameter greater than the diameter of tube 90 is provided to close the lower end of tube 90 to form a water tight compartment surrounding the envelope of lamp 16a. Attached to the circular plate 92 is a pair of tie rods 94 and 96 which are of sufficient length to extend the length of tube 90 and to extend through and above base plate 12a. As may be seen in Figure 7 these tie rods 94 and 96 are positioned within the tube 90. The upper ends of tie rods 94 and 96 are adapted to threadedly engage nuts 97 whereby to hold tube 90 in position against base plate 12a thereby to form a water tight enclosure for lamp 16a. Suitable gaskets 98 and 100 are provided at either end of tube 90 to insure a water tight connection between plate 92, tube 90, and base plate 12a.

An inlet to the water treating chamber is provided through fitting 39a which is adapted to threadedly receive pipe 37a. Connected to fitting 39a is a section of tubing 102 which extends from fitting 39a downwardly within casing 14a substantially parallel with the axis thereof and terminates a short distance above wall 22a. The incoming fluid will impinge upon the wall 22a and will be distributed through the bottom of casing 14a.

A horizontally extending baffle is positioned within and attached to casing 14a a short distance below the midpoint of wall 20a. Baffle 36a is attached to wall 20a throughout the circumference thereof and is provided in the center with an aperture to receive the lamp enclosure 32a and to provide an annular channel between enclosure 32a and the edge of the aperture in baffle 36a. This type of baffle 36a is preferred in certain installations since it need not be made of germicidal disinfecting radiation transmitting material as must the baffle 36 of Figure 2. This gives a more economical construction and increases the disinfecting efficiency by eliminating one surface which may become coated with various materials carried by the water being treated.

An orifice plate 52a similar to orifice plate 52 is provided for the reasons explained above with respect to orifice plate 52. Orifice plate 52a is provided with apertures to receive the retaining bolts 56a and orifices 66a. The outer edge of orifice plate 52 bears against a gasket 104 and the inner edge bears against gasket 100 whereby to form an outlet chamber 50a which connects through channel 106 in base plate 12a with an outlet fitting 108. An outlet pipe 44a is adapted to be threadedly connected to fitting 108.

The apparatus shown in Figures 6 and 7 is provided with the necessary electrical components for starting, stopping, and operating the germicidal lamp 16a, but these parts have been eliminated in Figure 6 for purposes of clarity. These parts and their connection and operation have been described above.

The spacing of the outer wall 20a of baffle 40a is placed at a point such that at least 90 per cent of the germicidal radiation is absorbed in the area between the source of radiation and the inner side of wall 20a as explained above with respect to the first embodiment of the invention. As has been pointed out, this spacing of wall 20a gives the maximum effectiveness and efficiency of killing and disinfection in the material being treated. The diameter of the aperture in baffle 36a is so chosen that the intensity of radiation at the edge 110 of baffle 36a is at least equal to the average intensity of the radiation throughout the apparatus. As may be seen from Figure 6 all of the fluid entering through tube 102 must flow up through the aperture formed between the edge 110 of baffle 36a and the enclosure to 90. A minimum disinfecting action is assumed by choosing an orifice plate 52a in conjunction with the inlet water pressure such that the rate of flow of water through the aperture in baffle 36a will give at least 99 per cent kill of the contaminating agencies by the intensity of radiation striking edge 110 of baffle 36a. The proper choice of orifice plate 52a and its relationship to the baffle in the inlet pressure have been fully explained above.

When a U-shaped 4-watt germicidal lamp is used as a source of disinfecting radiation, the diameter of the tube 90 and the casing 14a will be approximately 1½ and 6 inches respectively to obtain 90 per cent absorption of the germicidal radiation in the area between lamp 16a and casing 14a. The diameter of the aperture in the center of baffle 36a will be approximately 2½ inches to obtain the results outlined above. It is to be understood that the above figures are illustrative only and are not given by way of limitation.

Both of the embodiments described above insure at least a minimum effective decontamination or kill and by providing the changeable enclosure rings 52 and 52a the effectiveness of the kill may be maintained even though the apparatus may be used with a source of water for which it was not specifically designed. The particular water inlet arrangement also tends to increase the effectiveness of irradiation by directing the incoming water in a circular manner creating turbulence and thus prolonging the exposure time and insuring that all portions of the water to be treated are exposed to the germicidal radiation.

There has been provided, therefore, a water decontaminating apparatus which overcomes disadvantages of the prior devices and which fulfills the above described objects. More particularly the apparatus disclosed herein provides a surer, more effective and more efficient decontamination. In addition the apparatus may be adapted to be used with sources of supply having widely different supply pressures, and it is readily disassembled for cleaning, servicing and repair.

Although certain embodiments of the invention have been shown for purposes of illustration it is to be understood that the invention is not to be limited to the specific embodiments shown but is to be construed to include all variations and modifications thereof which come within the scope of the invention. Accordingly, the invention is to be limited only as set forth in the following claims.

The invention is hereby claimed as follows:

1. A water treating apparatus comprising a base plate, a source of germicidal disinfecting radiation mounted on said base plate, a substantially cylindrical casing mounted on said base plate, said casing being positioned concentric with respect to said source of radiation and being closed at one end whereby to form a closed chamber in cooperation with said base plate, said casing having a diameter such that at least 90 per cent of the germicidal radiation is absorbed between the source of radiation and the inner side of the outer cylindrical wall of said casing when the apparatus is in use, a baffle mounted in said chamber concentric with said source of radiation and interposed between said source of radiation and said casing, the nearest portion of said baffle to said source of radiation being spaced therefrom a predetermined distance to afford radiation thereat substantially equal to the average intensity of radiation between said source and said casing, an inlet and an outlet for said chamber, and a plate member carried by said base around said source of radiation and apertured therearound to promote proper flow distribution between said inlet and said outlet.

2. A water treating apparatus as set forth in claim 1 wherein the source of radiation is elongated and the baffle is disposed at substantially right angles to said source whereby to intercept a minimum of radiation.

3. A water treating apparatus comprising a base plate, a source of germicidal disinfecting radiation mounted on said base plate, a casing mounted on said base plate and cooperating therewith to form a closed chamber and enclosing said source of radiation, a baffle mounted on said casing and extending parallel to said base plate, said baffle having an aperture therein to provide a channel between said aperture and said source of radiation, an inlet for said chamber and an outlet for said chamber, said inlet and outlet being arranged on the same side of said baffle and a conduit leading from one thereof to the opposite side of said baffle so that the fluid introduced by said inlet must pass through said channel before reaching said outlet whereby to effect germicidal disinfection of the fluid.

4. A water treating apparatus comprising a base plate, a source of germicidal disinfecting radiation mounted on said base plate, a substantially cylindrical casing mounted on said base plate, said casing being positioned concentrically with respect to said source of radiation and being closed at one end whereby to form a closed chamber in cooperation with said base plate, said casing having a diameter such that at least 90 per cent of the germicidal radiation is absorbed between the source of radiation and the inner side of the outer cylindrical wall of said casing when the apparatus is in use, a baffle mounted in said chamber concentric with said source of radiation and interposed between said source of radiation and said casing, said baffle being substantially parallel to the base plate and spaced therefrom, the nearest portion of said baffle to said source of radiation being spaced therefrom a predetermined distance to afford radiation thereat no less than substantially the average intensity of radiation between said source and said casing, an inlet extending through said base plate for said chamber, an outlet extending through said base plate for said chamber, and a conduit extending from one of said inlet and said outlet through said baffle.

5. A water treating apparatus comprising a base plate, a source of germicidal disinfecting radiation mounted on said base plate, a casing mounted on said base plate, said casing being positioned concentric with respect to said source of radiation and forming a closed chamber in cooperation with said base plate, a baffle mounted in said chamber parallel to said base plate and concentric with said source of radiation and interposed between said source of radiation and said casing, an inlet in said base plate for said chamber, an outlet in said base plate for said chamber, and a conduit extending from one of said inlet and said outlet through said baffle.

6. A water treating apparatus comprising a substantially cylindrical casing having an inlet and an outlet at one end thereof, a source of germicidal disinfecting radiation mounted in said substantially cylindrical casing and substantially on the axis thereof, a baffle mounted in said casing concentric with said source of radiation and said casing, and a conduit extending from said inlet through said baffle and terminated adjacent the opposite end of said casing for effecting diffusion of the water by impingement against said opposite end of said casing.

7. A water treating apparatus comprising a base plate, a source of germicidal disinfecting radiation mounted on said base plate, a substantially cylindrical casing mounted on said base plate, said casing being positioned concentric with respect to said source of radiation and closed at one end whereby to form a closed chamber in cooperation with said base plate, said casing having a diameter such that at least 90 per cent of the germicidal radiation is absorbed between the source of radiation and the inner side of the outer cylindrical wall of said casing when the apparatus is in use, a baffle mounted in said chamber concentric with said source of radiation and interposed between said source of radiation and said casing, said baffle being substantially parallel to said base plate, the nearest portion of said baffle to said source of radiation being spaced therefrom a predetermined distance to afford radiation thereat substantially equal to the average intensity of radiation between said source and said casing, an inlet in said base plate for said casing, and conduit extending from said inlet through said baffle and terminated adjacent said end of said casing to effect diffusion of water by impingement against said end, and an outlet for said chamber leading through said base plate, said outlet including a ring having a plurality of orifices determined in accordance with the water pressure for timing flow and effecting proper flow distribution.

8. A water treating apparatus comprising a base, a source of germicidal disinfecting radiation mounted on said base, a casing mounted on said base and cooperating therewith to form a closed chamber enclosing the said source of radiation, said casing having a diameter such that at least 90% of the germicidal radiation is absorbed between the source of radiation and the inner side of the casing wall, a baffle mounted in said chamber concentric with said source of radiation and said casing, the nearest portion of said baffle to said source of radiation being spaced therefrom a predetermined distance to afford radiation thereat equal to substantially the average intensity of radiation between said source and said casing, inlet and outlet means for the chamber located respectively on opposite sides of said baffle and at least one including an annular ring surrounding the said source of radiation and fixed in position, and said ring including arcuately arranged orifices of a size and number determined in accordance with the water pressure for timing flow and promoting proper flow distribution.

9. A water treating apparatus comprising a base, a source of germicidal disinfecting radiation mounted on said base, a casing mounted on said base and cooperating therewith to form a closed chamber enclosing said source of radiation, a baffle mounted in said chamber concentric with said source of radiation and said casing, inlet and outlet means for the chamber located respectively on opposite sides of said baffle and at least one including an annular ring surrounding said source of radiation, and said ring including arcuately arranged orifice means of a size and number determined in accordance with the water pressure for timing flow and promoting proper flow distribution.

10. A water treating apparatus as set forth in claim 9 wherein said baffle is cylindrical and one of said inlet and outlet means is outside of said cylindrical baffle and the other is inside of said baffle.

11. A water treating apparatus as set forth in claim 10 wherein said annular ring and said cylindrical baffle are concentric and said ring lies substantially within the end to end confines of said cylindrical baffle.

12. A water treating apparatus as set forth in claim 11 wherein the outlet is inside of said baffle and the inlet is outside of said baffle.

13. A water treating apparatus as set forth in claim 9 wherein said inlet and outlet means both are located at least in part in said base.

14. A water treating apparatus as set forth in claim 9 and further including an enclosure of quartz or the like within said chamber and removably receiving the source of radiation.

15. A water treating apparatus comprising a base, a source of germicidal disinfecting radiation mounted on said base, an enclosure of quartz or the like mounted on said base and removably receiving said source of radiation, water inlet means on said base, water outlet means on said base, a casing detachably mounted on said base, a baffle mounted in said casing concentric with said source of radiation and said casing and intermediate said inlet and said outlet and means providing an annular channel around said source of radiation and including a plate member apertured therearound to promote proper flow distribution between said inlet means and said outlet means.

16. A water treating apparatus as set forth in claim 15 wherein the baffile is cylindrical and is mounted on said base.

MILTON RIDDIFORD.
RICHARD GOLDSTEIN.

References Cited in the file of this patent

UNITED STATES PATENTS

| Number | Name | Date |
|---|---|---|
| 1,051,350 | Nogier | Jan. 21, 1913 |
| 1,591,174 | Mailey | July 6, 1926 |
| 2,018,332 | Trebler et al. | Oct. 22, 1935 |
| 2,340,890 | Lang et al. | Feb. 8, 1944 |
| 2,533,690 | Raider | Dec. 12, 1950 |
| 2,537,774 | Machinist | Jan. 9, 1951 |

FOREIGN PATENTS

| Number | Country | Date |
|---|---|---|
| 5,635 | Great Britain | Dec. 12, 1912 |
| 326,249 | Great Britain | Mar. 10, 1930 |